(12) United States Patent
Miller et al.

(10) Patent No.: US 11,499,589 B2
(45) Date of Patent: Nov. 15, 2022

(54) ADJUSTABLE BALL JOINT (71) Applicant: Northstar Manufacturing Co., Inc., Minnetonka, MN (US)

(72) Inventors: Shawn Christopher Miller, Milaca, MN (US); Spenser Ryan Shimek, Coon Rapids, MN (US); Jeffrey Michael Goranson, Forest Lake, MN (US)

(73) Assignee: Northstar Manufacturing Co., Inc., Minnetonka, MN (US)

( * ) Notice: Subject to any disclaimer, the term of this patent is extended or adjusted under 35 U.S.C. 154(b) by 0 days.

(21) Appl. No.: 17/400,662

(22) Filed: Aug. 12, 2021

(65) Prior Publication Data

US 2021/0372463 A1 Dec. 2, 2021

Related U.S. Application Data (63) Continuation of application No. 15/800,305, filed on Nov. 1, 2017, now Pat. No. 11,131,337.

(51) Int. Cl.
*F16C 11/06* (2006.01)
*B60G 7/00* (2006.01)

(52) U.S. Cl.
CPC .......... *F16C 11/0695* (2013.01); *B60G 7/005* (2013.01); *F16C 11/0604* (2013.01); *B60G 2204/148* (2013.01); *B60G 2204/4302* (2013.01)

(58) Field of Classification Search
None
See application file for complete search history.

(56) References Cited

U.S. PATENT DOCUMENTS

| | | | |
|---|---|---|---|
| 844,421 A * | 2/1907 | Stafford | F22B 7/16 |
| | | | 122/493 |
| 1,646,288 A * | 10/1927 | Graham | F16C 11/0619 |
| | | | 403/DIG. 8 |
| 2,977,131 A | 3/1961 | Moskovitz et al. | |
| 3,061,344 A | 10/1962 | Gray et al. | |
| 3,104,117 A | 9/1963 | Pierce | |
| 3,127,192 A | 3/1964 | Traugott et al. | |
| 3,817,549 A | 6/1974 | Bohannon et al. | |
| 4,162,859 A | 7/1979 | McAfee | |
| 4,430,016 A | 2/1984 | Matsuoka et al. | |
| 4,482,266 A | 11/1984 | Kaneko | |
| 4,541,162 A | 9/1985 | Halvin | |
| 4,613,250 A | 9/1986 | Laucus | |
| 4,768,895 A | 9/1988 | Ludwig et al. | |
| 4,776,720 A | 10/1988 | Nolen | |
| 4,921,271 A | 5/1990 | Berry et al. | |
| 5,080,388 A | 1/1992 | Berry et al. | |
| 6,042,294 A | 3/2000 | Urbach | |
| 6,047,789 A * | 4/2000 | Iwanaga | B62D 17/00 |
| | | | 280/86.756 |
| 6,293,724 B1 | 9/2001 | Spears et al. | |
| 6,382,645 B1 | 5/2002 | Gravelle | |
| 6,557,872 B1 | 5/2003 | Garrard | |
| 6,676,142 B2 | 1/2004 | Allman et al. | |

(Continued)

*Primary Examiner* — Jonathan P Masinick
(74) *Attorney, Agent, or Firm* — Haugen Law Firm PLLP (57) ABSTRACT

An apparatus is described for interconnecting a steering knuckle and lower suspension arm. The apparatus includes a ball joint assembly having a height adjustment feature and a non-concentric ball and shaft that together allow for increased range of camber adjustment.

9 Claims, 11 Drawing Sheets

(56) References Cited

U.S. PATENT DOCUMENTS

| | | |
|---|---|---|
| 6,783,136 B2 | 8/2004 | Pronsias Timoney et al. |
| 7,481,595 B2 | 1/2009 | Urbach |
| 7,537,225 B2 | 5/2009 | Ryshavy |
| 7,568,711 B2 | 8/2009 | Houser |
| 7,618,047 B2 | 11/2009 | Kirby |
| 8,042,817 B2 | 10/2011 | Motebennur et al. |
| 8,757,648 B1 | 6/2014 | Winter |
| 9,254,724 B2 | 2/2016 | Corby |
| 9,409,598 B2 | 8/2016 | Giorgi et al. |
| 9,476,447 B2 | 10/2016 | Schmidt et al. |
| 9,643,645 B2 | 5/2017 | Dendis et al. |
| 9,982,711 B1 | 5/2018 | Henriksen |
| 10,308,089 B2 | 1/2019 | Elterman |
| 2004/0206202 A1 | 10/2004 | Hultquist |
| 2007/0001416 A1 | 1/2007 | Freytag |
| 2008/0284165 A1 | 11/2008 | Chiang |
| 2019/0071121 A1 | 3/2019 | Wilhelm |

\* cited by examiner

ADJUSTABLE BALL JOINT

CROSS-REFERENCE TO RELATED APPLICATIONS

This application is a continuation of U.S. patent application Ser. No. 15/800,305, filed on Nov. 1, 2017 and entitled Adjustable Ball Joint, the contents of which being incorporated herein its entirety.

FEDERAL SPONSORSHIP

Not Applicable

JOINT RESEARCH AGREEMENT

Not Applicable

TECHNICAL FIELD

The present invention relates to an adjustable ball joint, and more particularly to a ball joint capable of adjusting the separation distance between the steering knuckle and lower control arm of a vehicle. The adjustable ball joint in accordance with the present invention is further capable of adjusting the camber of the vehicle's wheel.

BACKGROUND

Ball joints have been used in automotive vehicle suspensions to provide rotational pivot joints between two structures within the suspension. By way of example, a ball joint is used to couple the steering knuckle and lower control arm of a vehicle. A typical ball joint includes a concentric shaft and partial sphere formed on the end of the shaft. The end of the shaft opposing the partial sphere is oftentimes threaded and fixed under the steering knuckle. The compact nature and simplification of steering knuckles and control arms of some vehicles has limited the ability to adjust suspension alignment characteristic, such as wheel camber. In some circumstances there may be a desire to adjust wheel camber even in compact or simplistic suspension assemblies.

SUMMARY

Embodiments according to aspects of the invention include an apparatus for adjusting a position of components within a suspension system. The apparatus of the invention is particularly well suited to interconnect the steering knuckle and lower control arm of a vehicle, while providing a height and camber adjustment. In an embodiment of the invention, the apparatus includes a height adjustable ball joint assembly. The ball joint assembly generally includes a ball joint housing, a stud having a ball formed on one end of the stud and a threaded portion formed on an opposing end of the stud. The ball joint assembly also includes a ball joint cup, and a ball joint mounting base. An offset mid-region of the stud interconnects the threaded portion of the stud and the ball extending from the end of the stud. A longitudinal or lengthwise axis of the threaded portion of the stud and a longitudinal or lengthwise axis of the mid-region of the stud are not concentric. The ball joint cup adapts to surround a portion of the ball and fits within the cavity of the ball joint housing. Further, the ball joint mounting base couples to the ball joint housing and is used to mount the apparatus to other components in the suspension system.

The embodiments according to aspects of the invention may additionally include a tapered shaft of the stud that is coupled between a steering knuckle and lower control arm of a vehicle. The tapered shaft extends between the offset mid region and the threaded portion of the stud. The threaded portion of the stud may couple to a control arm of the vehicle. Also, a portion of the ball joint housing extends through the ball joint mounting base in threading engagement, whereby the amount of ball joint housing extending through the ball joint mounting plate is adjustable. A jamb nut is coupled to an exterior of the housing and is used to fix the amount of the ball joint housing extending through the mounting base. Further, the ball joint cup may include expansion slits formed in the ball joint cup. Additionally, a grease fitting may be coupled to a top enclosed end portion of the ball joint housing. Grease may be forced into the cavity of the housing to provide grease to the ball and cup thereby reducing wear of the ball joint. The threaded portion of the stud may include an aperture extending through the stud such that the aperture may receive a cotter pin within the aperture. The cotter pin may be used to restrict turning of the shaft once the threaded portion of the stud is mounted to the lower control arm.

Another embodiment according to aspects of the invention includes a ball joint housing having a threaded external side portion and a cavity formed within the ball joint housing. A ball formed on one end of a stud fits within the housing. The stud has a threaded portion at an end of the stud, an offset mid-region, and the ball on the other end opposing the threaded portion of the stud. The longitudinal axis of the threaded portion of the stud and the longitudinal axis of the mid-region of the stud are not concentric. A ball joint cup surrounds a portion of the ball and is adapted to fit within the cavity of the ball joint housing. A ball joint mounting base has a threaded aperture that receives and engages with the threaded external side portion of the ball joint housing extending through the ball joint mounting base.

Additionally, the stud may have a tapered diameter extending between the offset mid region and the threaded portion. The tapered diameter is particularly well suited to positively locate the stud within a receiving hole of another component of the suspension assembly. The threaded portion of the stud may couple to a control arm of the vehicle and the ball joint mounting base may couple the ball joint housing to a steering knuckle of a vehicle. In this manner the amount of the housing extending through the ball joint mounting base is adjustable. Also, the threaded portion of the stud may include an aperture extending through the stud such that the aperture is adapted for receiving a cotter pin within the aperture. The cotter pin restricts rotation of the stud once the stud is secured to the other suspension component such as the lower control arm.

A further embodiment of the invention includes an apparatus for connecting the steering knuckle and control arm of a vehicle. The apparatus includes a ball joint housing having a threaded external side portion and a cavity formed within the housing. The apparatus includes a stud having a threaded portion at an end of the stud, an offset mid-region, and a ball formed on an end opposing the threaded portion of the stud. The threaded portion of the stud is adapted to couple to the control arm of the vehicle. The stud further has a tapered diameter extending between the offset mid region and the threaded portion, wherein the tapered diameter is sized to positively locate the apparatus to the control arm. The apparatus further includes a ball joint cup that may surround a portion of the ball and fits within the cavity of the ball joint housing. A ball joint mounting base of the apparatus has a threaded aperture adapted for receiving and engaging with the threaded external side portion of the ball joint housing. The ball joint housing extends through the ball joint mounting base in a threaded engagement. The ball joint mounting base is suitable for coupling the ball joint housing to a steering knuckle of a vehicle. An amount of the housing extending through the ball joint mounting base is adjustable to thereby adjust a separation distance between the steering knuckle and control arm. A jamb nut may couple to the threaded external side portion of the ball joint housing. Additionally, a longitudinal axis of the threaded portion of the stud and a longitudinal axis of the mid-region of the stud are not concentric. Further, the threaded portion of the stud may include an aperture extending through the stud such that the aperture is adapted for receiving a cotter pin within the aperture.

The accompanying drawings, which are incorporated in and constitute a portion of this specification, illustrate embodiments of the invention and, together with the detailed description, serve to further explain the invention. The embodiments illustrated herein are presently preferred; however, it should be understood, that the invention is not limited to the precise arrangements and instrumentalities shown. For a fuller understanding of the nature and advantages of the invention, reference should be made to the detailed description in conjunction with the accompanying drawings.

DESCRIPTION OF THE DRAWINGS

In the various figures, which are not necessarily drawn to scale, like numerals throughout the figures identify substantially similar components.

DETAILED DESCRIPTION

The following description provides detail of various embodiments of the invention, one or more examples of which are set forth below. Each of these embodiments are provided by way of explanation of the invention, and not intended to be a limitation of the invention. Further, those skilled in the art will appreciate that various modifications and variations may be made in the present invention without departing from the scope or spirit of the invention. By way of example, those skilled in the art will recognize that features illustrated or described as part of one embodiment, may be used in another embodiment to yield a still further embodiment. Thus, it is intended that the present invention also cover such modifications and variations that come within the scope of the appended claims and their equivalents.

The ball joint assembly 10 of the present invention generally includes a housing 40, ball joint stud 90, ball joint cup 76, retention nut 78, compression ring 80, jamb nut 70 and mounting base 60. FIGS. 1-5 illustrates a ball joint assembly 10 coupled to the bottom portion 22 of a steering knuckle 16. The steering knuckle is shown having spindle 14 coupled to the steering knuckle 16.

Figure 1:
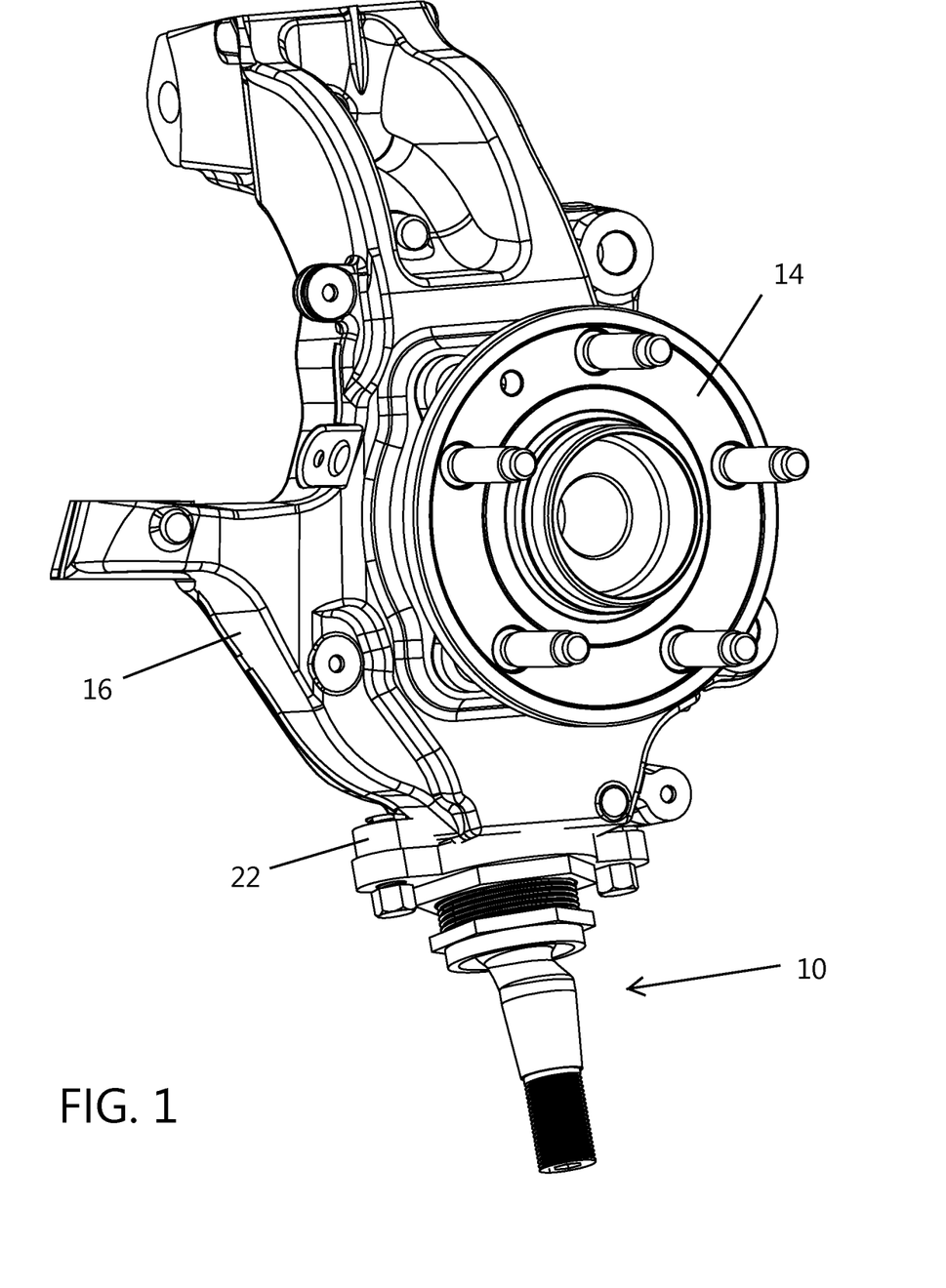
FIG. 1 is a front left perspective view of an adjustable ball joint assembly in accordance with an embodiment of the invention shown coupled to a steering knuckle of a vehicle.
Figure 2:
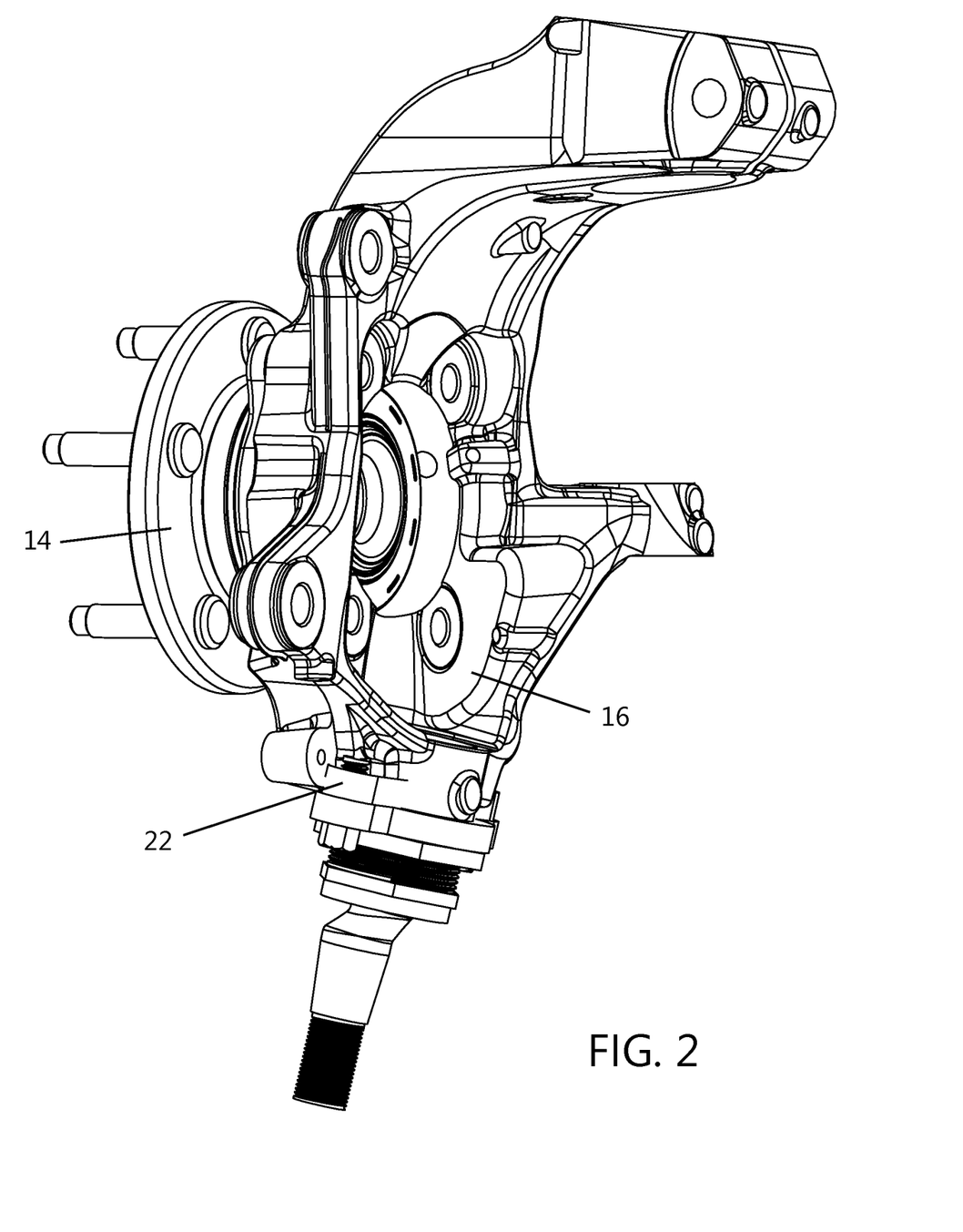
FIG. 2 is a back right perspective view of an adjustable ball joint assembly in accordance with an embodiment of the invention shown coupled to a steering knuckle of a vehicle.
Figure 3:
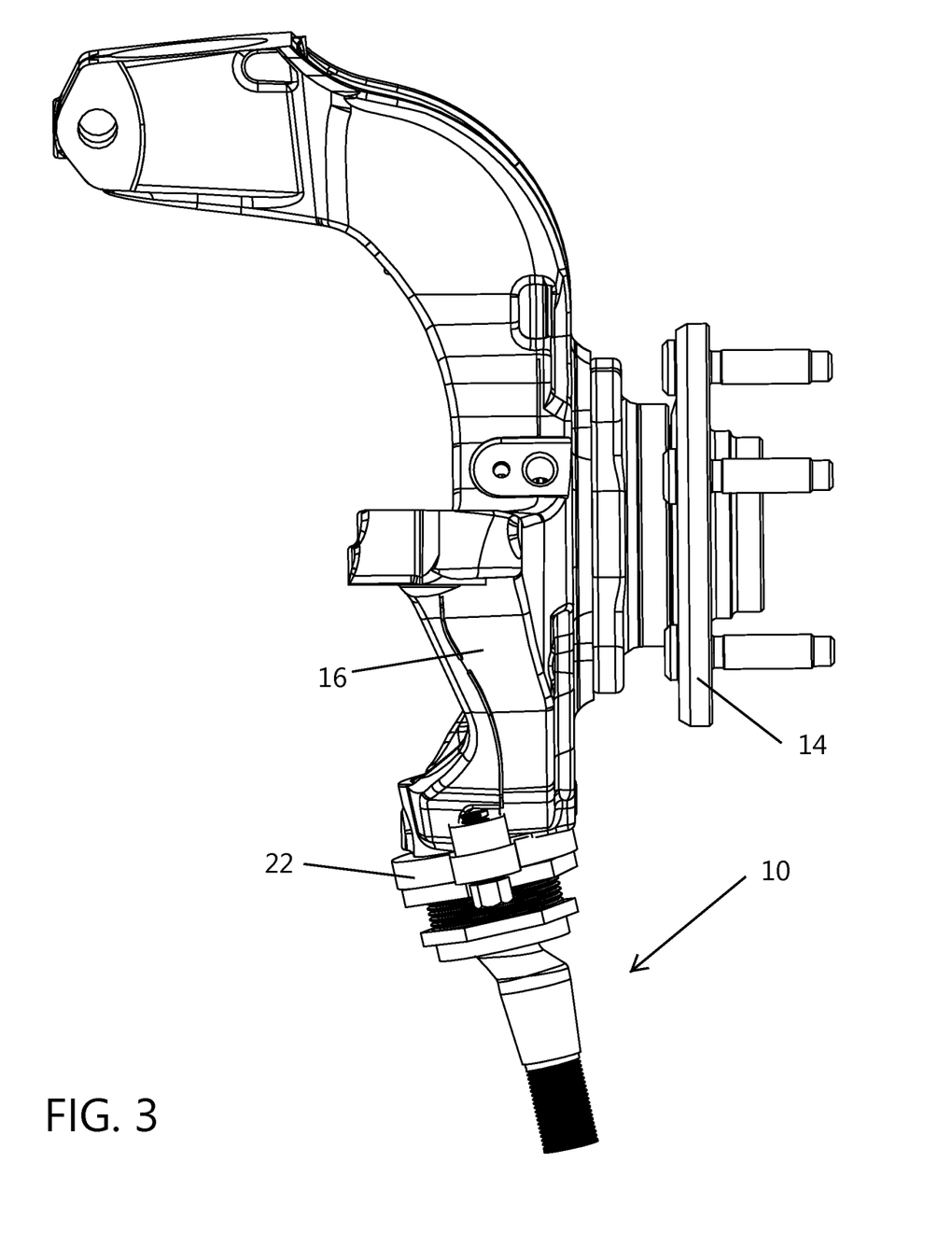
FIG. 3 is a left side perspective view of an adjustable ball joint assembly in accordance with an embodiment of the invention shown coupled to a steering knuckle of a vehicle.
Figure 4:
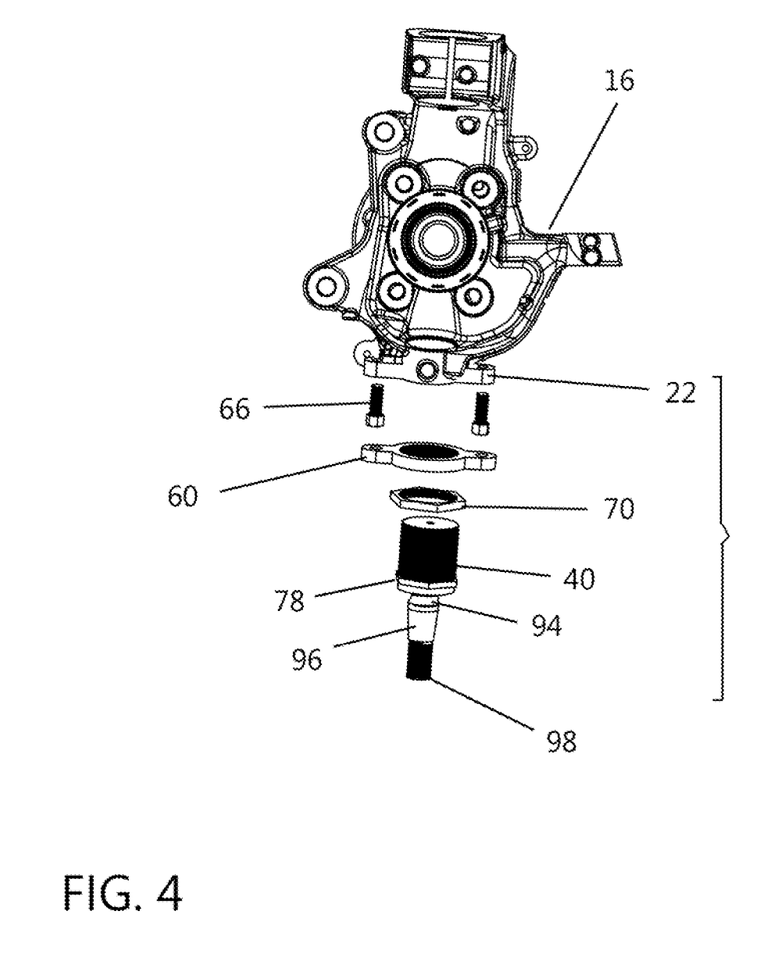
FIG. 4 is a back partial exploded perspective view of an adjustable ball joint assembly in accordance with an embodiment of the invention shown aligned with a steering knuckle of a vehicle.
Figure 5:
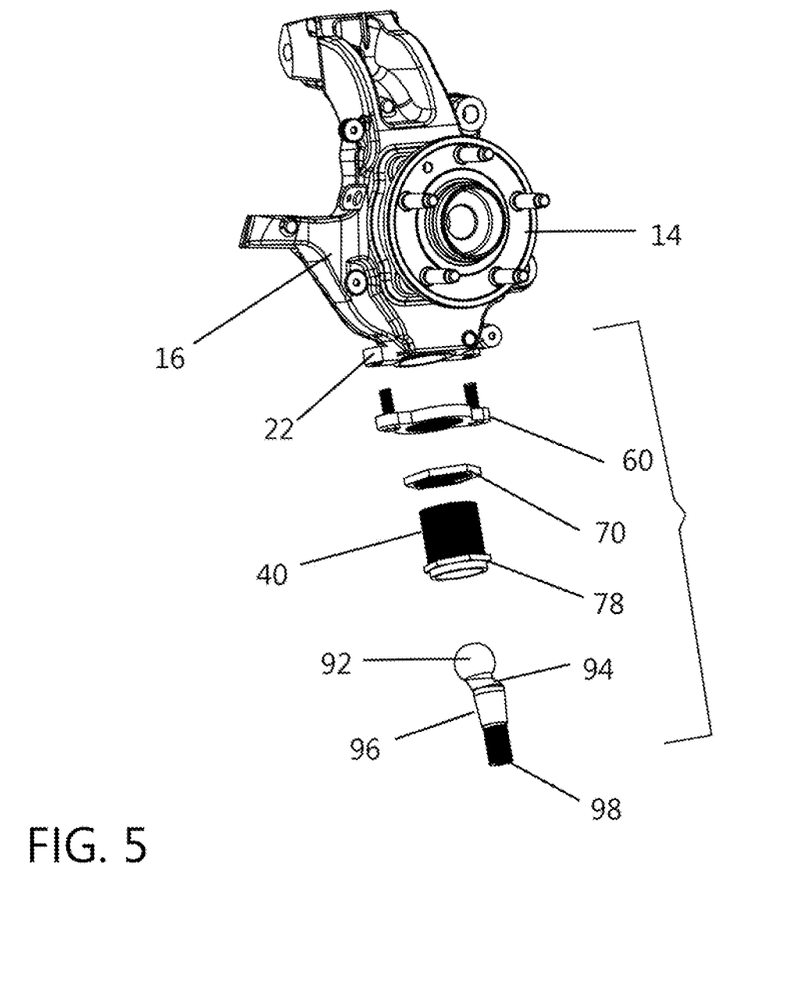
FIG. 5 is a front partial exploded perspective view of an adjustable ball joint assembly in accordance with an embodiment of the invention shown aligned with a steering knuckle of a vehicle.
Figure 6:
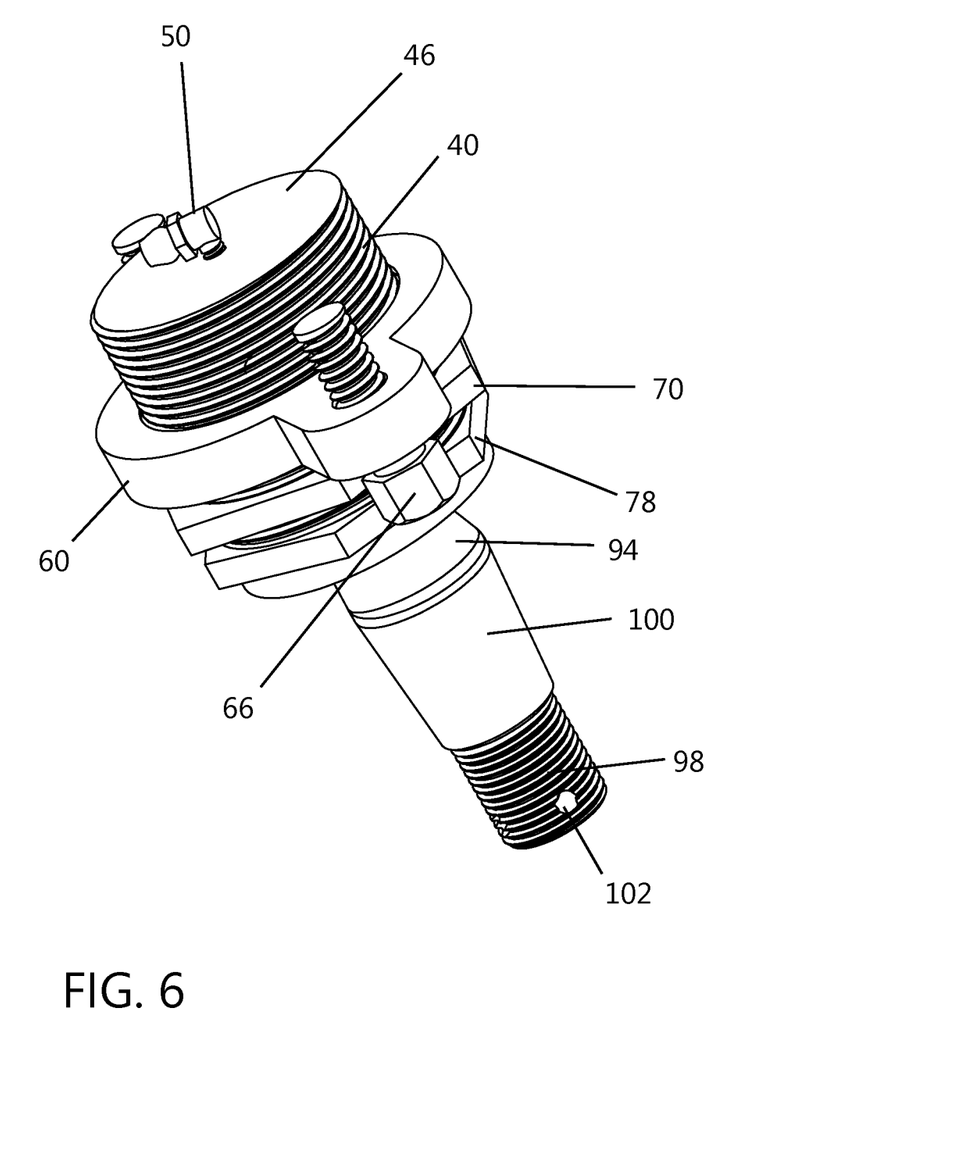
FIG. 6 is an upper perspective view of an adjustable ball joint assembly in accordance with an embodiment of the invention.
Figure 7:
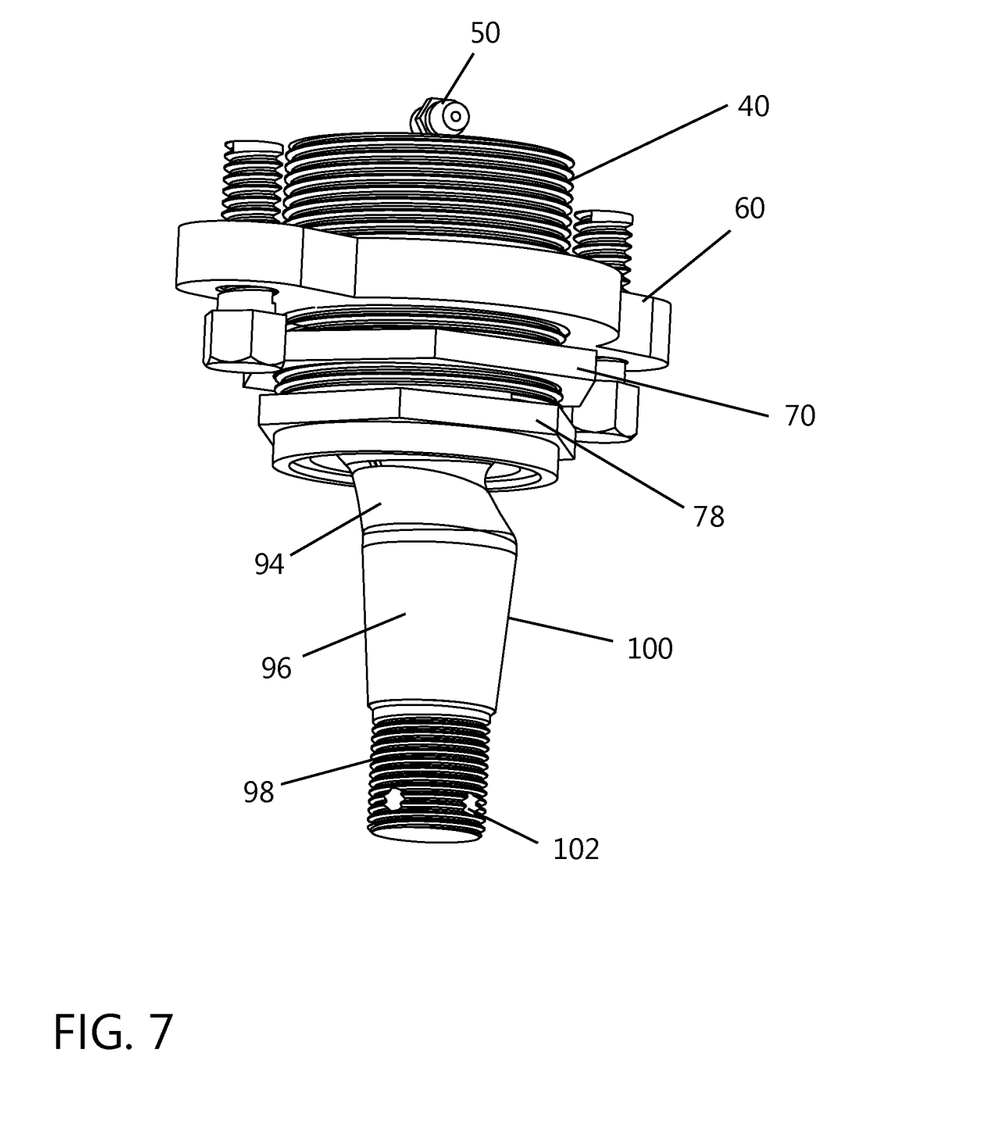
FIG. 7 is a side perspective view of an adjustable ball joint assembly in accordance with an embodiment of the invention.
Figure 8:
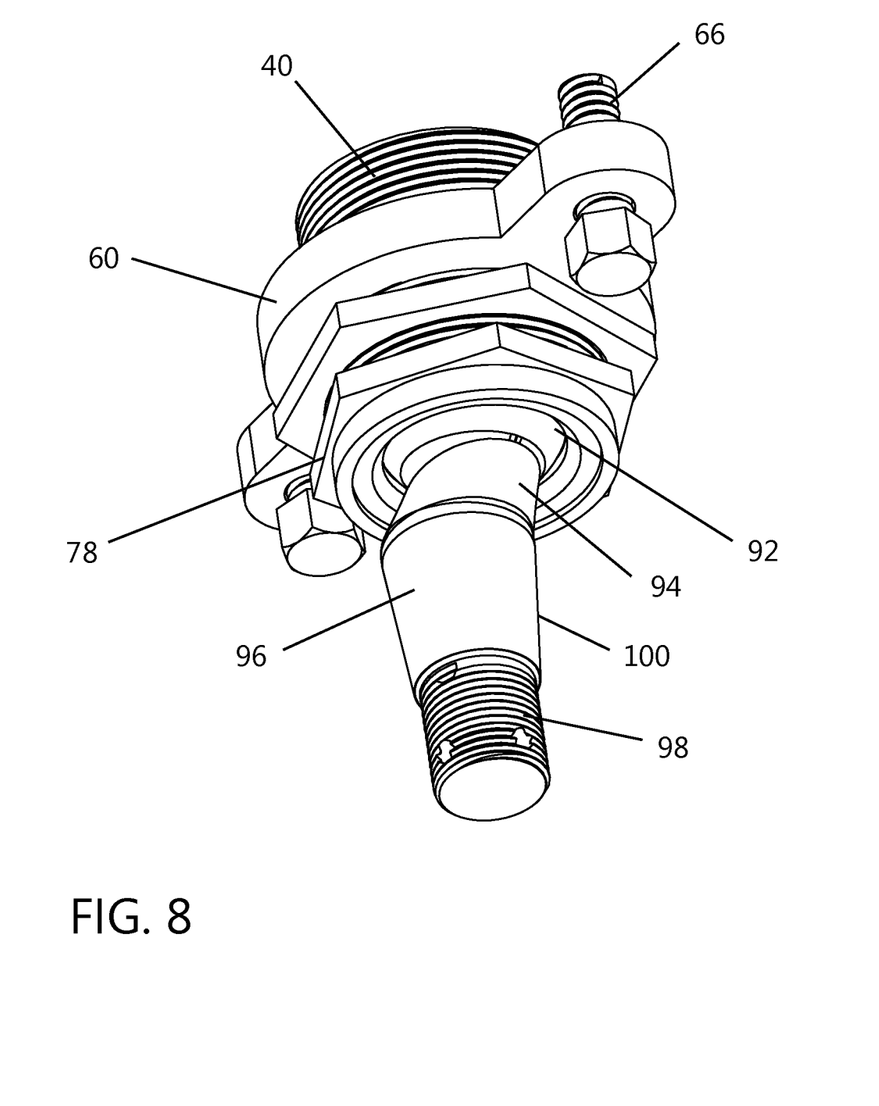
FIG. 8 is a lower perspective view of an adjustable ball joint assembly in accordance with an embodiment of the invention.
Figure 9:
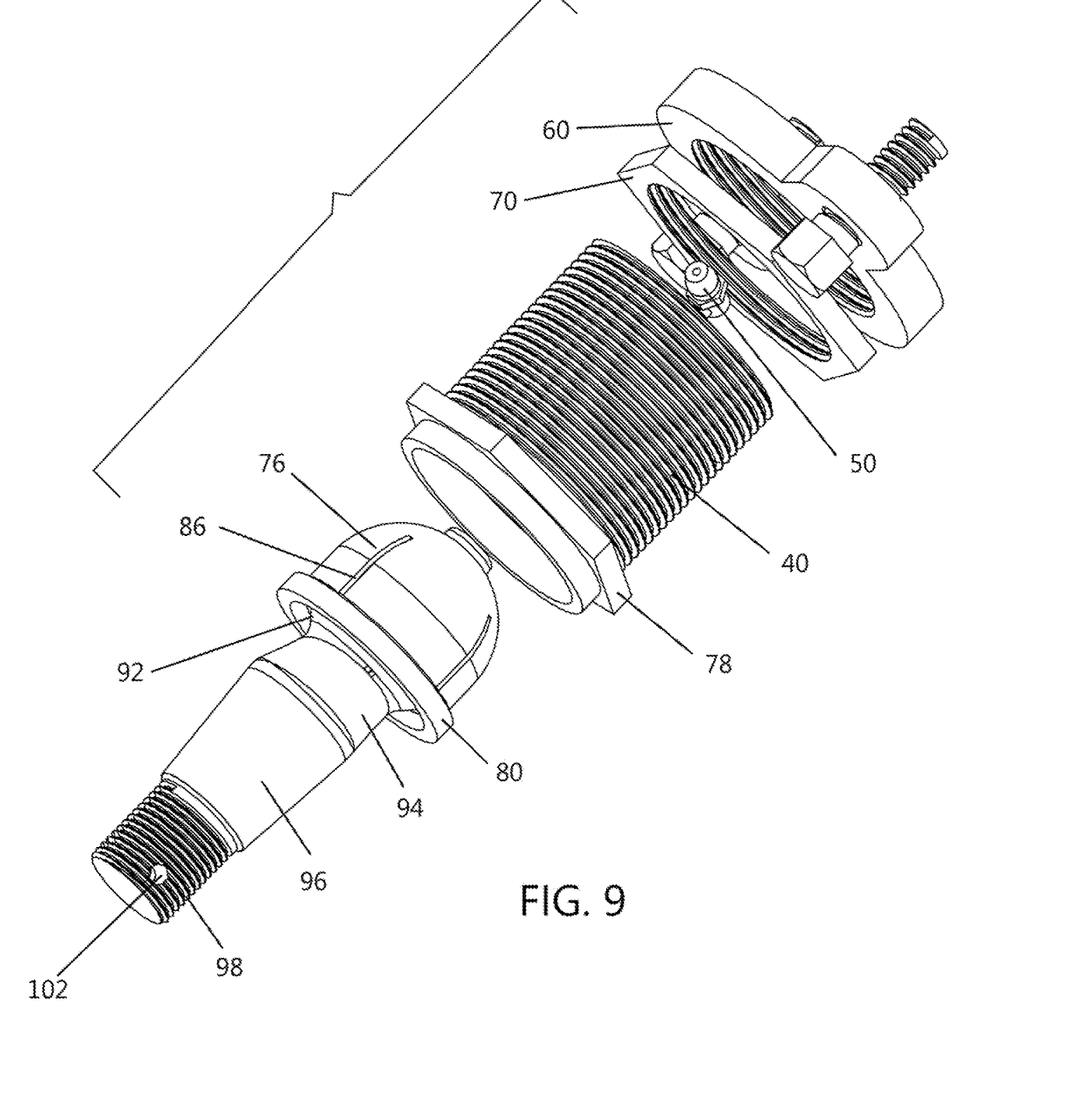
FIG. 9 is a partial exploded front perspective view of an adjustable ball joint assembly in accordance with an embodiment of the invention.
Figure 10:
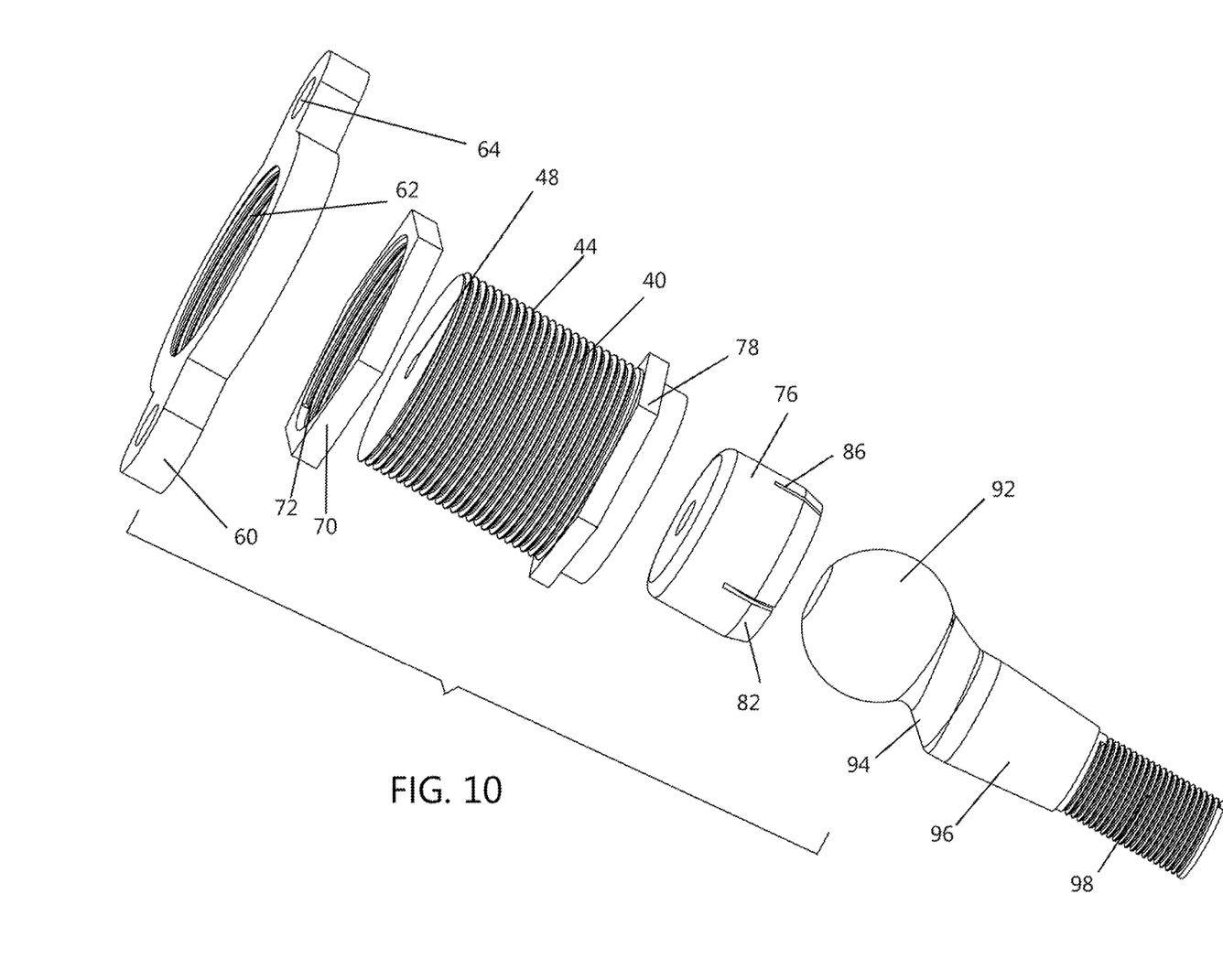
FIG. 10 is a partial exploded left back perspective view of an adjustable ball joint assembly in accordance with an embodiment of the invention.
Figure 11:
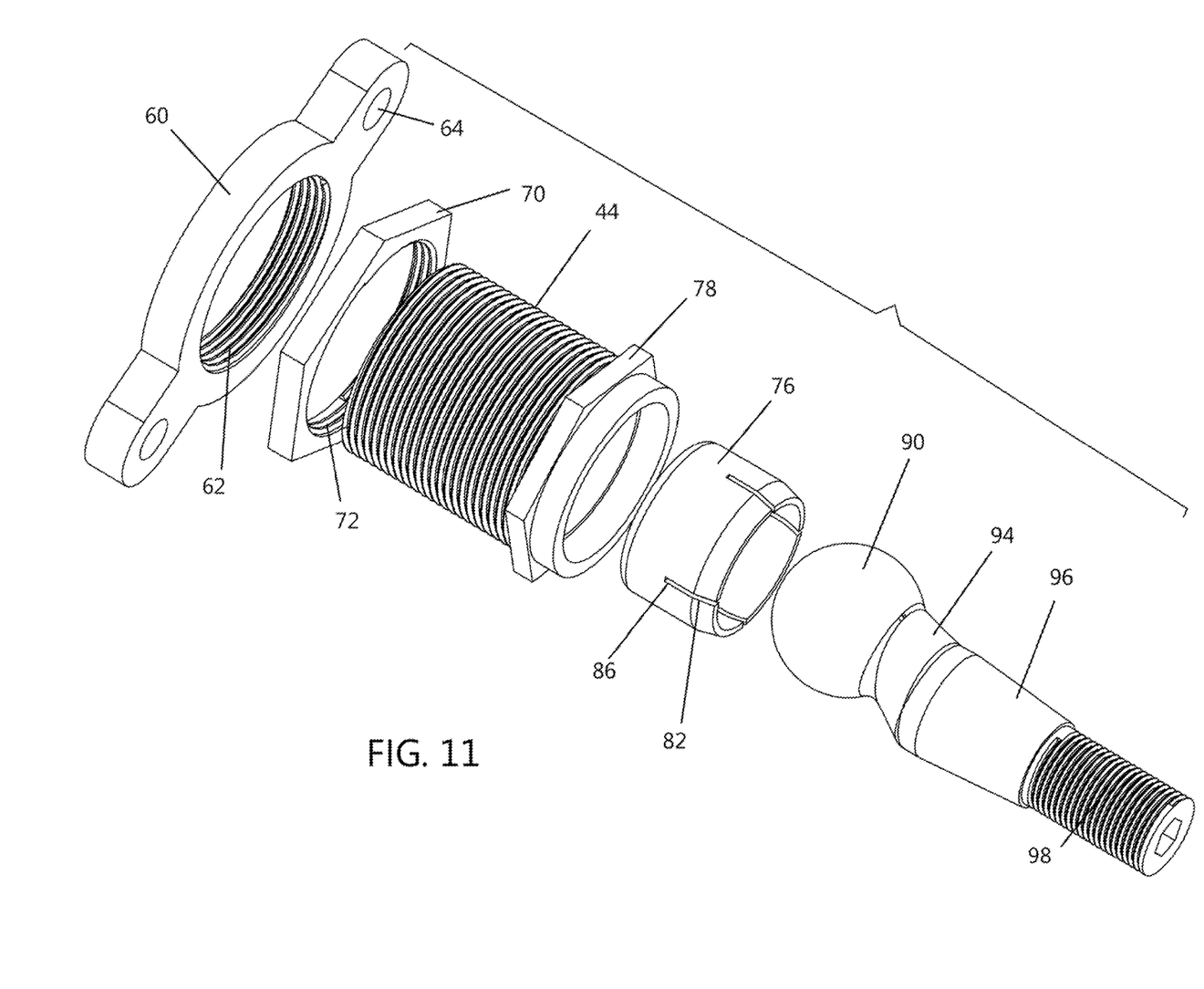
FIG. 11 is a partial exploded right back perspective view of an adjustable ball joint assembly in accordance with an embodiment of the invention.

With reference to FIGS. 4 and 5 the ball joint assembly 10 is shown partially disassembled but aligned and positioned below the steering knuckle 16. Bolts 66 extend through the bolt mounting holes 64 of the ball joint mounting base 60 to couple or fix the mounting base 60 to the bottom 22 of steering knuckle 16. Housing 40 includes threading 44 formed on the external sidewall of the housing. The threading 44 mates with a threaded bore 62 of the mounting base 60. The depth or amount of housing that is threaded or turned through the mounting base 60 is dependent upon the desired separation distance between the steering knuckle and lower control arm. Ball 92 of ball joint stud 90 is pressed into ball joint cup 76 and both are positioned within a cavity 42 formed in the housing 40. Compression ring 80 and retention nut 78 are coupled to the housing 40 to retain the ball 92 of the stud 90 within the housing 40. Once the desired separation distance or depth is achieved the jamb nut 70 may be tightened against retention nut 78 or mounting base 60 to keep the housing 40 from turning within the mounting base 60.

With further reference to FIGS. 6-11, additional detail of the ball joint assembly is illustrated. Housing 40 includes an enclosed top end 46 and a threaded aperture extends through the top. Grease fitting 50 is screwed into the threaded aperture 48 thereby allowing grease to be delivered into the cavity 42 of the housing 40. The jamb nut 70 includes an internal threaded bore that engages with the threads 44 formed on the housing 40. The compression ring includes a bevel that mates with a counter bevel 82 formed on the cup. As the retention nut is turned onto the housing 40, the compression ring 80 presses against the ball joint cup 76. The cup 76 includes slits 86 that expand and compress together to reduce the internal diameter of the cup. In this manner when the cup is compressed a gripping force is exerted against the ball 92 thereby restricting the stud 90 to the housing 40.

The ball joint stud 90 has a threaded portion 98 at an end of the stud 90. The stud 90 further has an offset mid-region of the stud that essentially offsets the ball 92 from the opposing threaded end of the stud. The offset results in a longitudinal axis of the threaded portion of the stud 98 that is not concentric with a longitudinal axis of the mid-region 94 of the stud 90. A central portion 96 of the stud 90 may include a tapered diameter 100 extending between the offset mid region 94 and the threaded end portion 98 of the stud 90. The tapered diameter 100 is sized to positively locate the apparatus 10 to the control arm.

An aperture 102 extends transversely through the threaded end portion 98 of the stud and receives a cotter pin therein. Once the threaded end portion 98 of the stud 90 is secured to the lower control arm (by way of example and with no limitation intended) the cotter pin may be positioned within the aperture 102 to reduce the ability of the stud from disengaging with the other suspension components. Additionally, a rubber boot may be provided that covers at least a portion of the ball joint assembly to reduce the amount of grit and dirt in the cavity of the housing 40.

These and various other aspects and features of the invention are described with the intent to be illustrative, and not restrictive. This invention has been described herein with detail in order to comply with the patent statutes and to provide those skilled in the art with information needed to apply the novel principles and to construct and use such specialized components as are required. It is to be understood, however, that the invention can be carried out by specifically different constructions, and that various modifications, both as to the construction and operating procedures, can be accomplished without departing from the scope of the invention. Further, in the appended claims, the transitional terms comprising and including are used in the open ended sense in that elements in addition to those enumerated may also be present. Other examples will be apparent to those of skill in the art upon reviewing this document.

The invention claimed is:

1. A dual-adjustment joint apparatus securable to a steering knuckle and a control arm of a vehicle, the joint apparatus comprising:
   a housing defining a cavity and an opening to the cavity, and a housing axis extending through the cavity and the opening, the housing having an external threading at an outer surface thereof;
   a joint stud having a first end portion, a second end portion, and a mid portion connecting the first and second end portions, the first end portion having a first central longitudinal axis extending from a first end of the joint stud to the mid portion, and the second end portion having a second central longitudinal axis extending from a second end of the joint stud to the mid portion, wherein the first and second central longitudinal axes are parallel to one another and not coincident, the first end portion being pivotally receivable in the cavity through the opening;
   a mounting base securable to one of the steering knuckle and the control arm, the mounting base having a threaded aperture for threadable engagement with the external threading of the housing, wherein the housing is axially adjustable along the housing axis through selective threadable engagement of the housing with the threaded aperture of the mounting base; and
   a first locking means for locking an axial position of the housing with respect to the mounting base.

2. The dual-adjustment joint apparatus as in claim 1 wherein the first end portion of the joint stud includes a spherical surface, and the second end portion of the joint stud includes external threading.

3. The dual-adjustment joint apparatus as in claim 2 wherein the first locking means includes a jamb nut that is threadably engageable with the external threading of the housing.

4. The dual-adjustment joint apparatus as in claim 3 wherein the jamb nut is axially bearable against the mounting base along the housing axis.

5. The dual-adjustment joint apparatus as in claim 4, including a joint cup defining a receptacle that is configured for engagement of the first end portion of the joint stud, the joint cup being receivable in the cavity of the housing.

6. The dual-adjustment joint apparatus as in claim 5 wherein the receptacle is configured for engagement with the spherical surface of the first end portion.

7. The dual-adjustment joint apparatus as in claim 5 wherein the joint cup includes a flange.

8. The dual-adjustment joint apparatus as in claim 7, including a compression member threadably engageable with the external threading of the housing to secure the first end portion of the joint stud within the receptacle of the joint cup.

9. The dual-adjustment joint apparatus as in claim 8 wherein the housing is axially adjustable along the housing axis with respect to the mounting base to thereby adjust a separation distance between the steering knuckle and the control arm.

* * * * *